July 12, 1949.    G. B. FARKAS ET AL    2,476,031
REHEATER
Filed Dec. 2, 1944    2 Sheets-Sheet 1
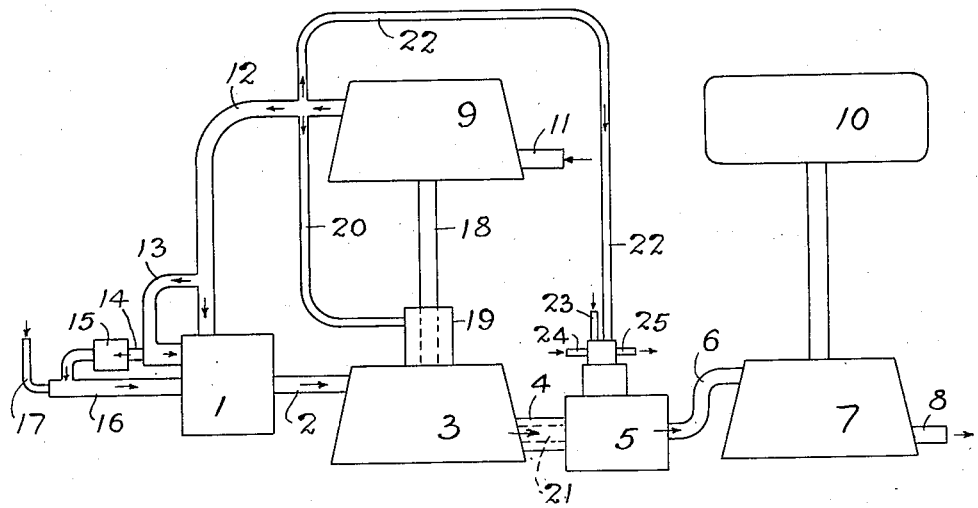
- FIG.1.-
INVENTOR
George B. Farkas
Addison Y. Gunter
BY
S.C. Yeaton
ATTORNEY July 12, 1949.   G. B. FARKAS ET AL   2,476,031
REHEATER
Filed Dec. 2, 1944   2 Sheets-Sheet 2
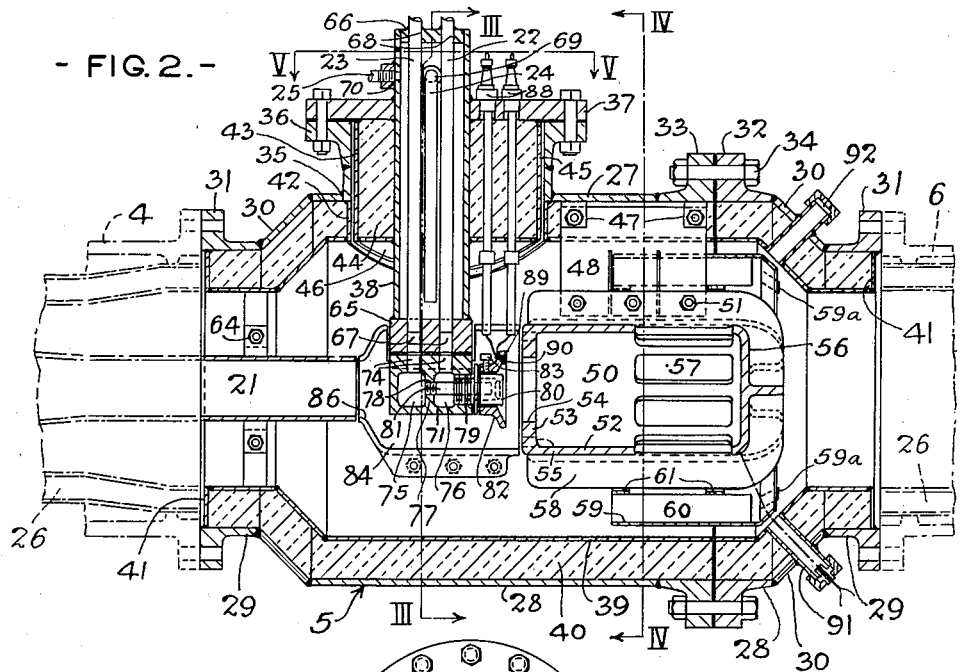
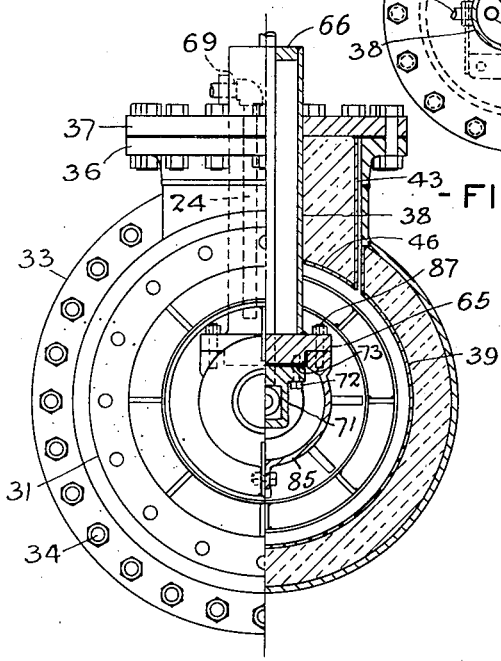
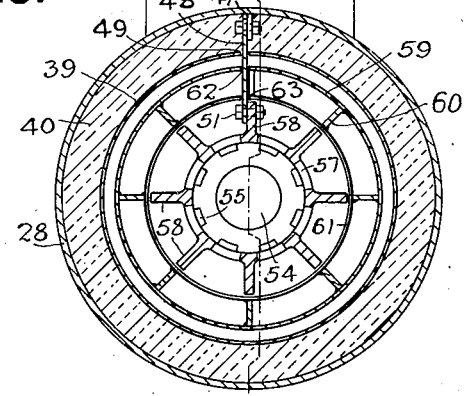
INVENTORS
George B. Farkas
Addison Y. Gunter
BY
S. C. Yeaton
ATTORNEY Patented July 12, 1949

2,476,031

UNITED STATES PATENT OFFICE 2,476,031

REHEATER

George B. Farkas, Jackson Heights, and Addison Y. Gunter, Larchmont, N. Y., assignors to American Locomotive Company, New York, N. Y., a corporation of New York Application December 2, 1944, Serial No. 566,378

8 Claims. (Cl. 60—44)

This invention relates to reheaters and more particularly to a reheater for exhaust gas.

The object of the present invention is to provide an improved reheater for adding heat to a fluid, for instance exhaust gas from a gas turbine being delivered to a lower pressure gas turbine for driving same.

Referring to the drawings forming a part of this application, Figure 1 is a diagrammatic view of a power plant embodying the reheater of the present invention; Fig. 2 is a section on the line II—II of Fig. 4, parts being shown in full, of a reheater constructed in accordance with this invention, parts of pipes connected to the reheater being indicated in dot and dash lines; Fig. 3 is, at the left, an end view of the reheater taken from the left of Fig. 2 and, at the right, a section on the line III—III of Fig. 2; Fig. 4 is a section on the line IV—IV of Fig. 2; and Fig. 5 is a section on the line V—V of Fig. 2.

The power plant shown in Fig. 1 includes a combustion chamber 1 for producing hot gas under pressure. This gas is delivered through a pipe 2 to a high pressure turbine 3. The partially spent hot exhaust gas of the high pressure turbine is delivered through a pipe 4 to a reheater 5 constructed in accordance with this invention. Heat and air are added to the exhaust gas in the reheater and delivered through a pipe 6 to a low pressure turbine 7, and exhausted therefrom or delivered to some other equipment through a pipe 8.

The high pressure turbine drives an air compressor 9 and the low pressure turbine drives a generator 10. The air compressor obtains its air through a pipe 11 and pumps this air under pressure into a pipe 12 through which it is delivered to the combustion chamber. If desired, pipe 12 may extend through a heat exchanger heated by the exhaust from the low pressure turbine. A branch 13 of pipe 12 delivers air to another point in the combustion chamber. A branch 14 of branch 13 delivers air to a booster 15 which raises the pressure of the air and delivers it for fuel oil atomization through a pipe 16 to another point of the combustion chamber.

Fuel oil is delivered to pipe 16 for mixture with the air therein through a pipe 17.

The high pressure turbine 3 drives the air compressor 9 by means of the usual shaft 18. This shaft enters the turbine through a sleeve 19 to which air is delivered through a branch 20 of pipe 12. This air cools the bearings of the turbine and is thereby heated. It is customary to refer to this air as "gland air." This gland air is delivered to the reheater through a pipe 21 disposed internally in pipe 4.

The reheater receives fuel oil atomization air under pressure through a branch 22 of pipe 12 and fuel oil through a pipe 23. Cooling water is delivered to the reheater through a pipe 24 and withdrawn therefrom through a pipe 25.

Pipes conducting hot air or gas may be insulated in any suitable manner, internally or externally. For instance pipes 4 and 6 are lined with insulating material 26.

The reheater 5 is shown in detail in Figs. 2 to 5. It includes a casing 27 having an enlarged cylindrical center portion 28 and reduced end portions 29 connected to the center portion by conical portions 30. The casing is a welded structure. It has a bolting flange 31 at each end, the front (inlet end) flange 31 being connected to the pipe 4 and the rear (outlet end) flange to the pipe 6. The casing is made of a rear flanged part 32 and a front flanged part 33 bolted together by bolts 34, the rear part including the rear flange 31, conical portion 30 and a short piece of the center portion 28, all as is clearly shown in Fig. 2.

An orifice 35 is formed in the top of the center portion 28 and a flanged nozzle 36 is welded therein. The nozzle is closed at its upper end by a plate 37 bolted to the nozzle flange. A section of pipe 38 extends through and is welded in an orifice in plate 37, pipe 38 extending above plate 37 and downward into the casing about one-third the depth of the casing, for a purpose presently to appear.

A retainer 39 for insulating material 40 is disposed in the casing for insulating the walls thereof. Retainer 39 is of substantially the same shape as casing 27 but is smaller, providing a space for the insulating material between the retainer and the casing. The retainer is made of two parts similar to the casing but the two parts do not have adjacent bolting flanges and are not secured together. The retainer is a welded structure. It includes end walls 41 welded to the inner faces of the flanges 31, and a collar 42 in line with and welded to nozzle 36.

A retainer 43 for insulating material 44 is disposed in nozzle 36, the retainer 43 having a vertical cylindrical wall 45 adjacent the inner face of nozzle 36 and the inner face of collar 42 and a curved end wall 46 welded to the vertical wall 45 at its bottom edge and to the pipe 38, wall 46 being in line with the adjacent portions of retainer 39. The vertical wall 45 is welded at its top to plate 37.

Two lugs 47 depend from the top of the casing to the rear of the nozzle 36 and a plate 48 is bolted to these lugs and depends into the casing to substantially the same depth as the pipe 38. The retainer 39 has a slot 49 through which the plate 48 passes.

A combustion chamber 50 is hung from and secured to plate 48 by bolts 51. The combustion chamber is a casting and it includes a cylindrical wall 52 concentric with the casing, a front end wall 53 having a central inlet orifice 54 and a peripheral row of inlet orifices 55, and a closed rear wall 56. A row of outlet ports 57 is provided in the rear half of the wall 52. External longitudinal fins 58 are formed on the outer surface of the wall 52 and these fins extend over the wall 56, being radial of the center thereof, the fins being disposed between the ports 57. The bolts 51 pass through orifices in the top center fin 58. A sleeve 59 having internal fins 60 in line with fins 58 surrounds the combustion chamber. Two spaced rings 61 are welded to the inner edges of the fins 60 for supporting the sleeve on the fins 58. Sleeve 59 has a slot 62 through which the plate 48 passes, and the front ring 61 has a similar slot 63. The rear end of sleeve 59 is conical, similar to the adjacent wall of the retainer 39. Sleeve 59 is spaced horizontally from the retainer by spacers 59a welded to the conical rear end of sleeve 59. The assembly of sleeve 59, fins 60 and rings 61 being welded together and guided on fins 58 can be easily removed for inspection and repair when the bolts 34 have been removed.

Pipe 21 extends into the casing to a point vertically in line with the foremost point of collar 42. The pipe 21 is supported by a bracket 64 bolted to the casing.

A block 65 is welded to the bottom of pipe 38 and a plate 66 is welded to the top of pipe 38. Block 65 has two vertical orifices 67 in line with two vertical orifices 68 in plate 66. Pipes 22 and 23 extend through and are sealed in orifice 68 and are sealed at their lower ends in orifices 67. Pipe 24 passes through an orifice 69 in pipe 38 and extends almost to the block 65, opening at its lower end and projecting its cooling water directly against the block. Pipe 25 is secured to pipe 38 over an orifice 70 therein. The inside of pipe 38 therefore forms a jacket for cooling water cooling the pipes 22 and 23 and the block 65. The water enters through the pipe 24 and is released in the pipe 38 at its bottom adjacent the block, as aforesaid, and flows upwardly therethrough and out through the pipe 25.

A burner 71 is secured to the block 65 by bolts 72, a gasket 73 being provided between the burner and block. The burner has inlet orifices 74 in line with orifices 67, the orifice 74 in line with pipe 23 opening into a chamber 75 in the burner, and orifice 74 in line with pipe 22 opening into a chamber 76 in the burner, the two chambers 75 and 76 being separated by a partition 77 having a threaded orifice 78. The burner is provided with a threaded orifice 79 adjacent and opening into chamber 76, the chamber 76 being disposed between the orifice 79 and chamber 75. A nozzle 80 is threaded in orifice 79 with its mouth opening from the burner in a rearward direction, and a pipe 81 is threaded in orifice 78 and extends in and opens into the nozzle 80. Thus fuel oil from pipe 23 and atomizing air under pressure from pipe 22 mix in the nozzle 80 and are injected therefrom through the open mouth of the nozzle and through orifice 54 into the combustion chamber, orifice 54 being in line with the nozzle.

A burner shield 82 is secured to the nozzle by a set screw 83.

A cover 84 formed of two parts 85 bolted together, is disposed over the burner, the cover being cut out to extend around the block 65 and having a front inlet orifice 86 in line with pipe 21. The cover is secured to the block by bolts 87, best shown in Fig. 3. The cover is open at its rear and its rear edge is in line with the cylindrical wall 52 of the combustion chamber. The casing 27 houses the cover and combustion chamber providing a gas mixing chamber in the space therebetween. The cover houses the burner providing an air duct therebetween.

Two ignition electrodes 88 are secured in orifices in the plate 37 and extend therefrom through the insulation 44, wall 46 and cover 84. The wires of the electrodes extend through an orifice 89 in the burner shield and are insulated therefrom by a plug 90. A thermocouple connection 91 is connected to the reheater at the bottom of the rear conical wall 30 and a peep hole fitting 92 is connected in the top of this wall.

The operation of the reheater is as follows:
Partially spent hot exhaust gas from the high pressure turbine enters the reheater through the pipe 4 and flows through the gas mixing chamber around the various parts of the reheater inside of retainer 39 and mixes with the products of combustion leaving the combustion chamber by means of the ports 57, as will presently appear. This exhaust gas may enter the reheater, for example, at 52.4 pounds pressure and at 1207 degrees Fahrenheit. The flow may be at the rate of 30,000 pounds per hour. The hot exhaust gas is further heated by the metal of the combustion chamber 50 that it comes in contact with, especially the fins 58, thereby cooling this metal so that excessive temperatures of the metal do not result, and is further heated by direct mixing with the products of combustion entering the space between the combustion chamber and the sleeve 59 by way of the ports 57, sleeve 59 preventing the products of combustion leaving ports 57 from impinging on the retainer 39.

Fuel oil and atomizing air are injected into the combustion chamber through the nozzle 80, the atomizing air being at about 73 pounds pressure, and are ignited by the electrodes and burned in the combustion chamber. Gland air from the high pressure turbine enters the reheater through the pipe 21, flowing into the cover, through the orifice 86 and flowing in the air duct around the burner and block, and then flowing through the orifices 54 and 55 into the combustion chamber, mixing with the burning fuel oil and atomizing air, and cooling this burning mixture so that the temperature of the metal of the combustion chamber does not become excessive. This gland air may enter the reheater at 325 degrees Fahrenheit and at the rate of 2340 pounds per hour. During the operation of the reheater, water is continuously flowing through pipe 38.

The entire mixed products of the reheater, consisting of burned fuel and atomized air, gland air and exhaust gases from the high pressure turbine, leave the reheater into the pipe 6 at about 1300 degrees Fahrenheit, which is a temperature which the low pressure turbine can well withstand.

When it is desired to clean the burner, the bolts holding plate 37 in place may be removed and plate 37 lifted from the casing. The parts secured to the plate, which include the burner 71 and cover 84, are removed with the plate, the cover being so dimensioned that it will pass through the nozzle 36.

While there has been hereinbefore described an approved embodiment of the invention, it will be understood that many and various changes and modifications in form, arrangement of parts and details of construction thereof may be made without departing from the spirit of the invention, and that all such changes and modifications as fall within the scope of the appended claims are contemplated as a part of this invention.

The invention claimed and desired to be secured by Letters Patent is:

1. A reheater for partially spent hot gas comprising a casing; a combustion chamber; a burner; a cover; the casing serving to house the combustion chamber and cover in spaced relation therewith and providing therebetween a gas reheating chamber, and the cover serving to house the burner in spaced relation therewith and providing therebetween an air duct enclosed by the cover from the gas reheating chamber, said casing having a front inlet for the partially spent gas and a rear outlet for the reheated gas, the burner having fuel and atomizing fluid inlets and adjacent thereto a fuel atomizing nozzle opening from the burner in a rearward direction, the cover having a front air inlet for the duct and an outlet at its rear, the combustion chamber being disposed rearward of the cover and having its front end adjacent and open to the burner and the cover outlet for receiving the gases emerging therefrom and having openings in its rear portion for permitting the passage of the products of combustion into the reheating chamber; and a conduit for supplying air to the cover front air inlet and for closing the cover front inlet from the gas reheating chamber.

2. A reheater for partially spent hot gas comprising a casing; a combustion chamber; a burner; a cover; and a protecting shield, said casing serving to house the combustion chamber and cover in spaced relation therewith and to provide therebetween a gas mixing chamber and serving also to house the shield in spaced relation with and between the casing and combustion chamber at the rearward portion of the combustion chamber and providing an inner and an outer passage open at their fronts and rears, and the cover in turn serving to house the burner in spaced relation therewith and providing therebetween an air duct, the casing having a rear outlet for the mixed gas and a front inlet for the partially spent gas, the burner having fuel and atomizing fluid inlets and rearward thereof a nozzle having a mouth opening therefrom in a rearward direction, the cover having a front air inlet for the duct and being open at its rear and the combustion chamber being disposed rearward of the cover and having its front end adjacent of the cover and open to said nozzle mouth and cover rear opening for receiving the gases emerging therefrom and being open laterally at its rear portion into the inner passage for emitting gas contained therein to the mixing chamber.

3. A reheater for partially spent hot gas comprising a casing; a combustion chamber; a burner; and a cover; the casing serving to house the combustion chamber and cover in spaced relation therewith and to provide therebetween a gas mixing chamber; the cover serving in turn to house the burner in spaced relation therewith and to provide therebetween an air duct; the casing having a rear outlet for the mixed gas and a front inlet for the partially spent gas, the burner having lateral fuel and atomizing fluid inlets and rearward thereof a nozzle having a mouth opening from the burner in a rearward direction, the cover having a front air inlet for the duct and being open at its rear and the combustion chamber being disposed rearward of the cover and having its front end adjacent and open to the nozzle mouth and cover rear opening for receiving the gases emerging therefrom and being open at its rear portion for emitting gas contained therein to the mixing chamber; a tube extending laterally through the casing and having an inlet and an outlet for cooling liquid thereby to provide a cooling chamber; a fuel pipe; and an atomizing fluid pipe, the pipes extending through the liquid-cooling chamber and connected respectively to the burner fuel and atomizing fluid inlets.

4. A reheater for partially spent hot gas comprising a casing having a lateral orifice; a combustion chamber; a pipe extending into said casing and having an outlet end in said casing facing rearwards and an inlet exterior of said casing for cooling air; and a device including a burner and a cover, the casing serving to house the combustion chamber and cover in spaced relation therewith and to provide therebetween a gas mixing chamber, the cover serving to house the burner in spaced relation therewith and to provide therebetween an air duct, the casing having a rear outlet for the mixed gas and a front inlet for the partially spent gas, the burner having fuel and atomizing fluid inlets and rearward thereof a nozzle having a mouth opening from the burner in a rearward direction, the cover having also a front inlet open to the pipe outlet and being open at its rear end, and the combustion chamber being disposed rearward of the cover and having its front end open to the nozzle mouth and the cover rear opening for receiving the gases emerging therefrom and being open at its rear portion for emitting gas contained therein to the mixing chamber, the device further including a closure detachably secured to said casing covering the lateral orifice, a tube extending through the closure to the burner and having an inlet and an outlet for cooling liquid providing a cooling chamber, a fuel pipe and an atomizing fluid pipe, such pipes extending through the liquid-cooling chamber and being connected respectively to the burner fuel and compressed atomizing air inlets, and fuel ignition electrodes extending through the closure to the nozzle mouth, the device being free for removal from the casing through the lateral orifice as a unit.

5. A reheater adapted for straight line flow of incoming partially spent hot gas and outgoing reheated gas comprising a casing having aligned front and rear openings respectively in its front and rear ends, and an opening in its side; a fuel-atomizing nozzle in said casing opening rearwardly toward said rear opening, said nozzle being in line with said side opening; pipes for conducting fuel and atomizing fluid to said nozzle, said pipes passing through said side opening; a cover surrounding said nozzle in spaced relation with the inner face of said casing and having front and rear openings respectively in its front and rear ends; a combustion chamber in spaced relation with said casing inner face and having a front end opening adjacent and in line with said cover rear opening and being open at its rear end portion effecting communication with said casing; and an air duct in spaced relation with said casing inner face and extending from said cover front opening to said casing front opening whereby separate streams of partially spent gas and air are admitted to said reheater through said casing front opening, said duct delivering said air to said cover without said air mixing with said partially spent gas, said partially spent hot gas passing from said casing front opening around said duct, cover and combustion chamber and mixing with the products from said combustion chamber entering said casing from said combustion chamber rear open end.

6. A reheater comprising an open-ended casing adapted to permit the passage of fluid therethrough for the purposes of reheating, a nozzle disposed in the casing, air and fuel oil supply means leading through the casing wall to the nozzle, a cover surrounding the nozzle and disposed in spaced relation to the casing inner face to form a gas reheating chamber therebetween, air supply means in closed communication with the front end of the nozzle cover, a combustion chamber having its front end in closed communication with the rear end of the nozzle cover, and port means adjacent the rear end of the combustion chamber communicating with the reheating chamber to permit the products of combustion to mix with and reheat the fluid passing through the apparatus to be reheated.

7. A reheater, according to claim 6, in which the combustion chamber has a plurality of radial fins upon its outer wall extending into the reheating chamber.

8. A reheater, according to claim 7, having supporting means for the combustion chamber between the casing and one of such fins.

GEORGE B. FARKAS.
ADDISON Y. GUNTER.

REFERENCES CITED

The following references are of record in the file of this patent:

UNITED STATES PATENTS

| Number | Name | Date |
|---|---|---|
| 781,308 | Smith | Jan. 31, 1905 |
| 1,863,391 | Bluemel | June 14, 1932 |
| 2,000,733 | Avery | May 7, 1935 |
| 2,097,544 | Ames | Nov. 2, 1937 |
| 2,164,954 | Stephens | July 4, 1939 |
| 2,227,666 | Noack | Jan. 7, 1941 |
| 2,231,445 | Grapp | Feb. 11, 1941 |
| 2,249,489 | Noack | July 15, 1941 |
| 2,295,177 | King | Sept. 8, 1942 |